July 30, 1935.                E. W. BEEKMAN                2,009,869
                              MAGAZINE FEEDER
                        Filed April 6, 1934        6 Sheets-Sheet 1

INVENTOR
Everett W. Beekman
BY
Spencer Hardman & Fehr
his ATTORNEYs

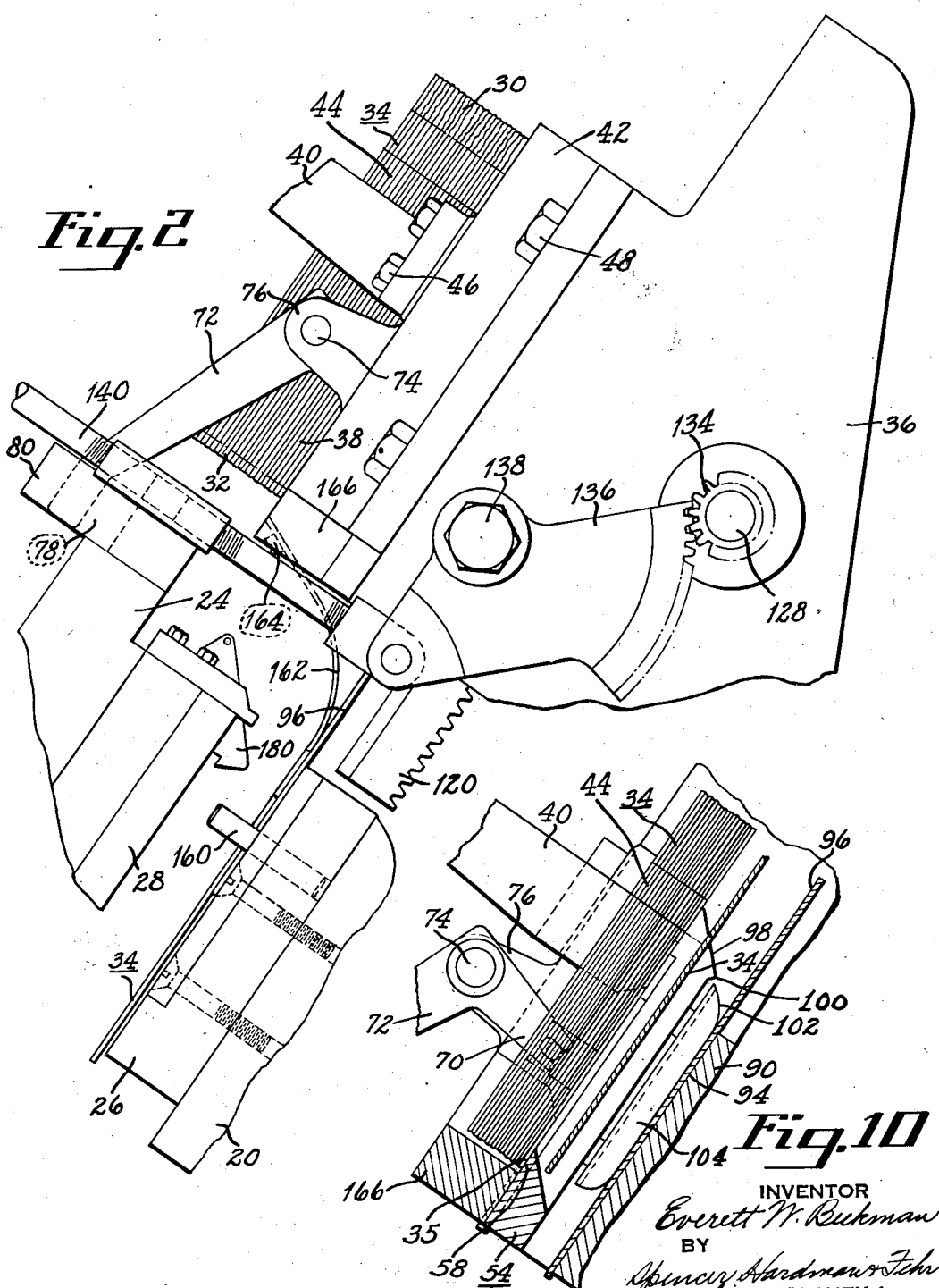

July 30, 1935.  E. W. BEEKMAN  2,009,869
MAGAZINE FEEDER
Filed April 6, 1934  6 Sheets-Sheet 3
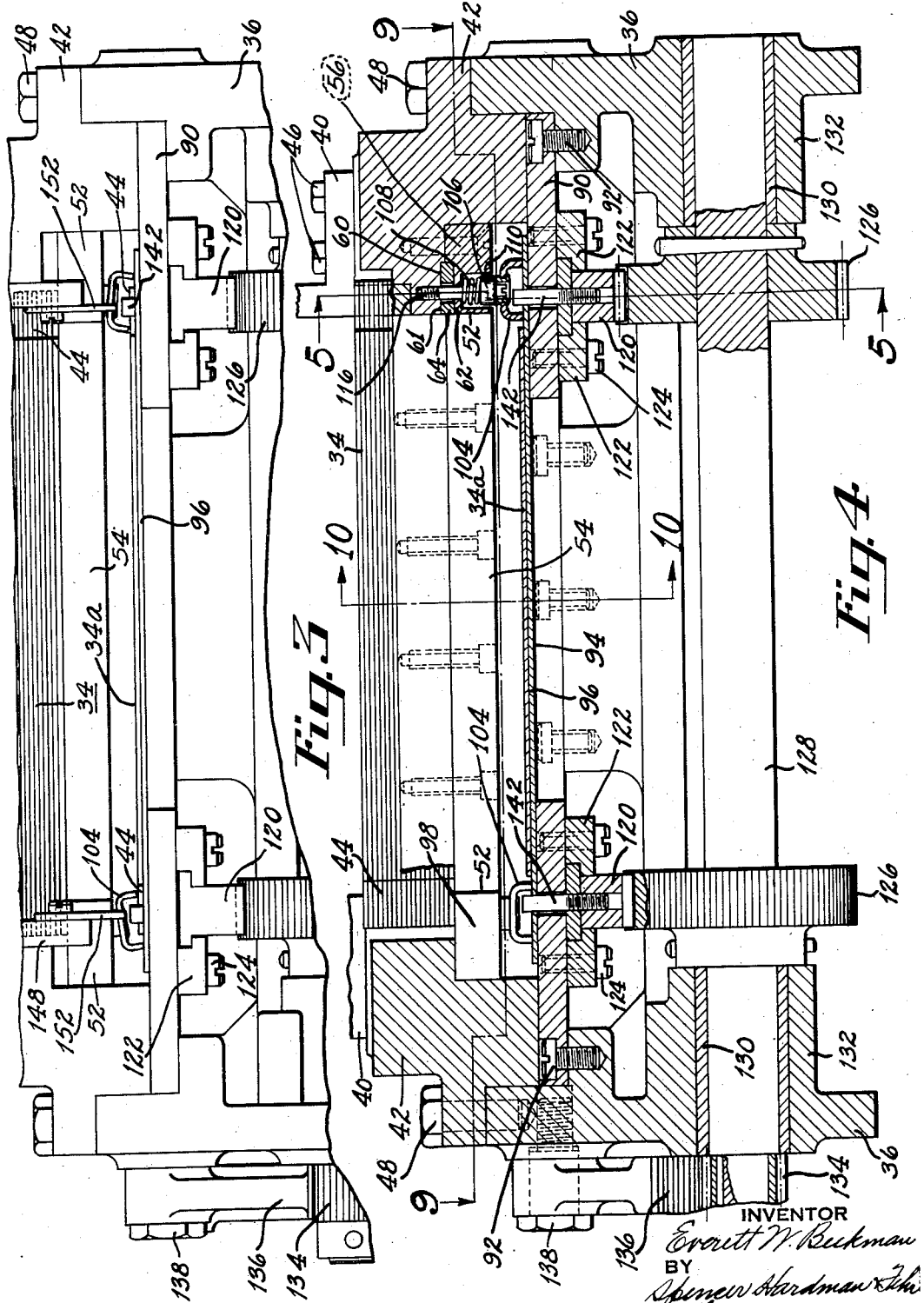
INVENTOR
Everett W. Beekman
BY
Spencer Hardman &c.
his ATTORNEYS July 30, 1935.  E. W. BEEKMAN  2,009,869

MAGAZINE FEEDER

Filed April 6, 1934  6 Sheets-Sheet 4

INVENTOR
Everett W. Beekman
BY
Spencer Hardman & Fehr
his ATTORNEYS

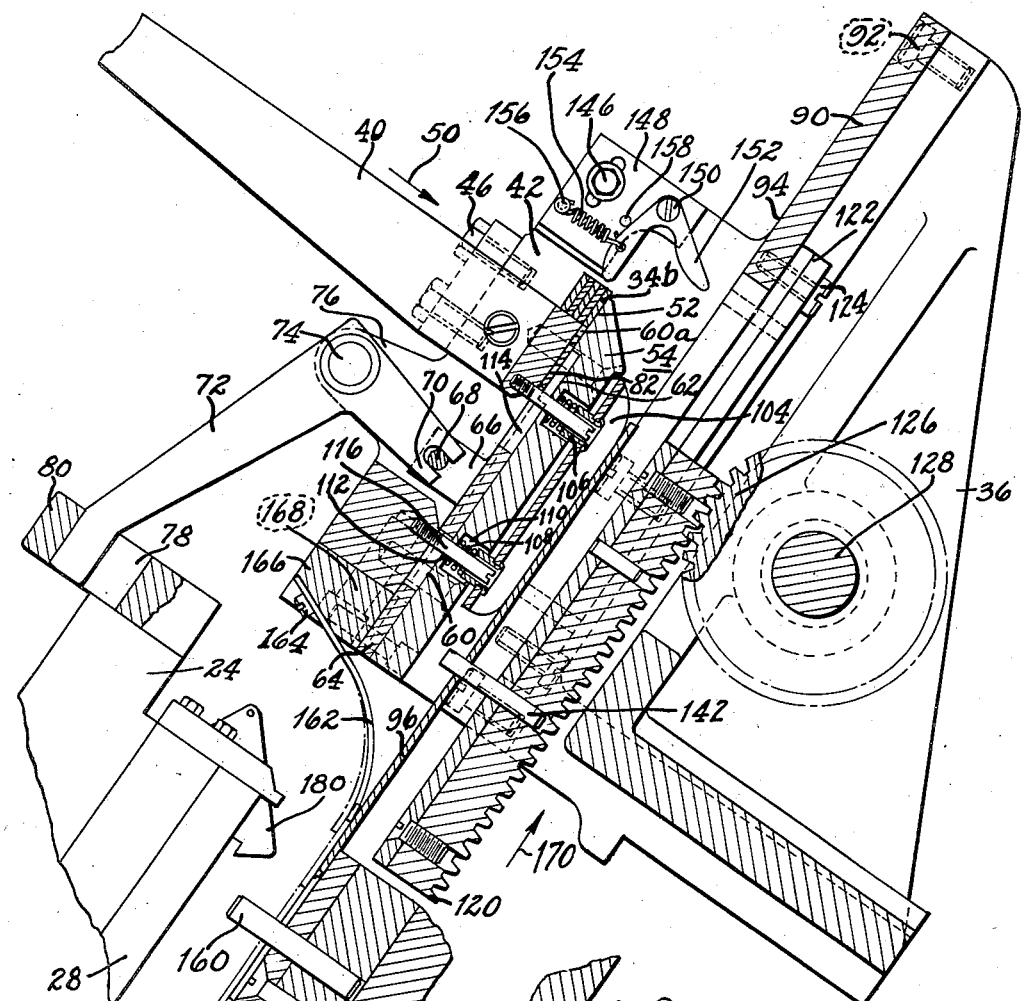
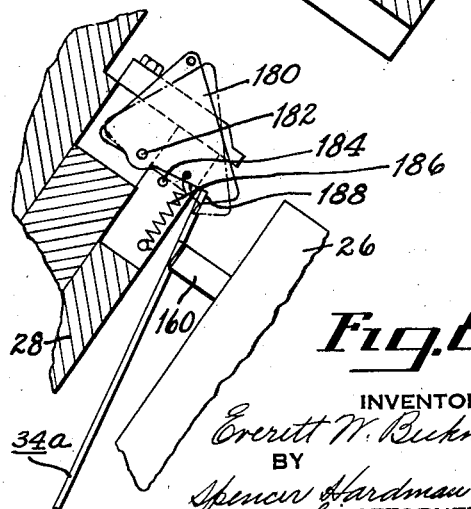
Fig. 7
Fig. 8

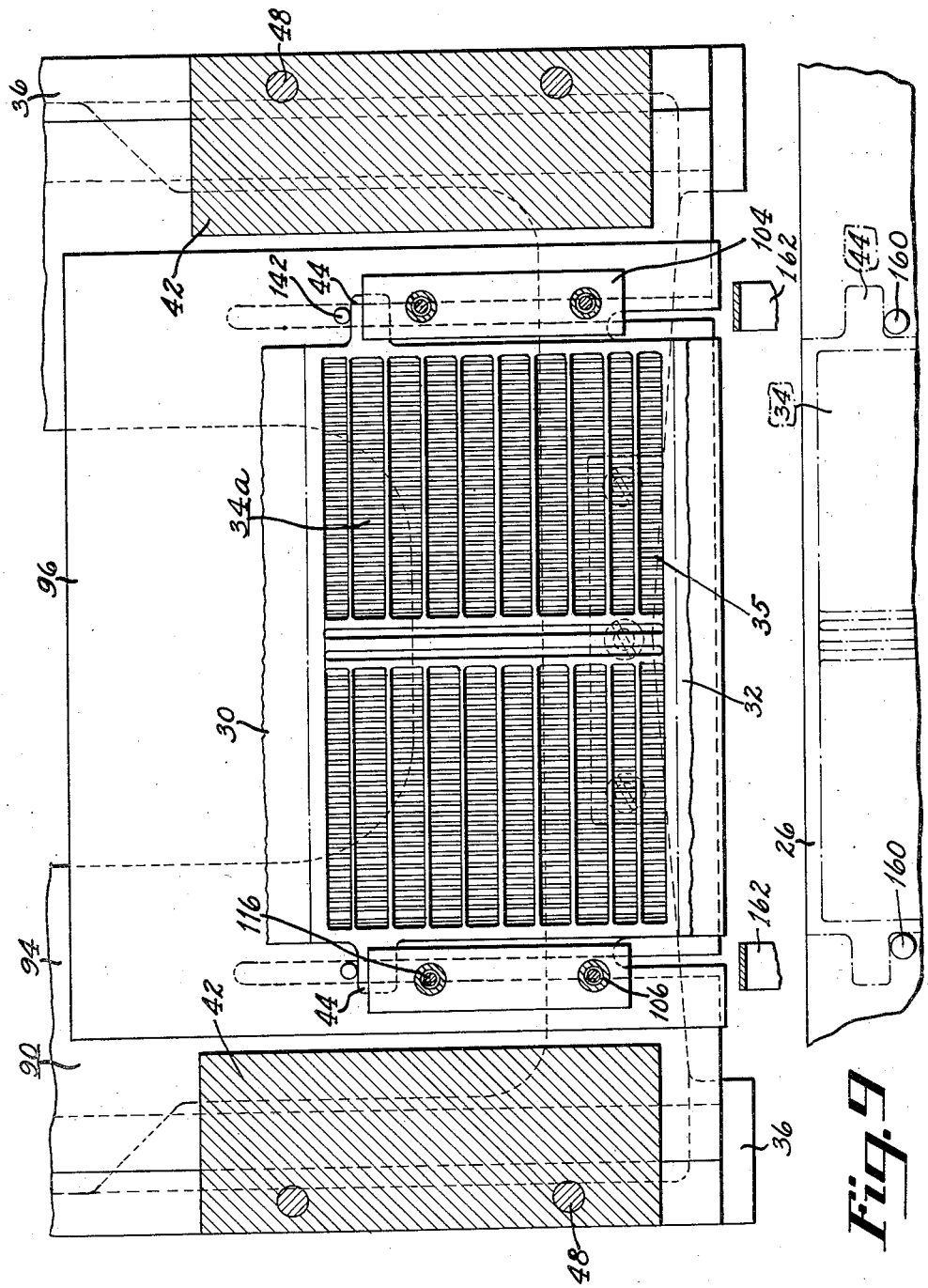

Patented July 30, 1935

2,009,869

UNITED STATES PATENT OFFICE 2,009,869

MAGAZINE FEEDER

Everett W. Beekman, Muncie, Ind., assignor to General Motors Corporation, Detroit, Mich., a corporation of Delaware Application April 6, 1934, Serial No. 719,307

31 Claims. (Cl. 164—48)

This invention relates to magazine feeders and particularly to a device for feeding storage battery grids or elements of like shape from a magazine to a station in which a trimming or similar operation is performed upon the grids.

It is among the objects of the present invention to provide for a continual and automatic feeding of grids from a readily accessible magazine, holding a supply of grids in stacked order, to a trimming station.

It is another object of the present invention to provide for automatic ejection of the trimmed grids from the trimming station.

Further objects and advantages of the present invention will be apparent from the following description, reference being had to the accompanying drawings wherein a preferred embodiment of the present invention is clearly shown.

In the drawings:

Fig. 2 is a fragmentary side elevation of the present invention.

Fig. 3 is a fragmentary view looking in the direction of arrow 3 in Fig. 1.

Fig. 4 is a sectional view taken on the line 4—4 of Fig. 5.

Figs. 6 and 7 are sections similar to Fig. 5 showing, however, certain elements of the machine in different positions of operations.

Fig. 8 is a fragmentary sectional view disclosing the operation of the ejecting means.

Fig. 9 is a section taken on the line 9—9 of Fig. 4.

Fig. 10 is a section taken on the line 10—10 of Fig. 4.

Figure 1:
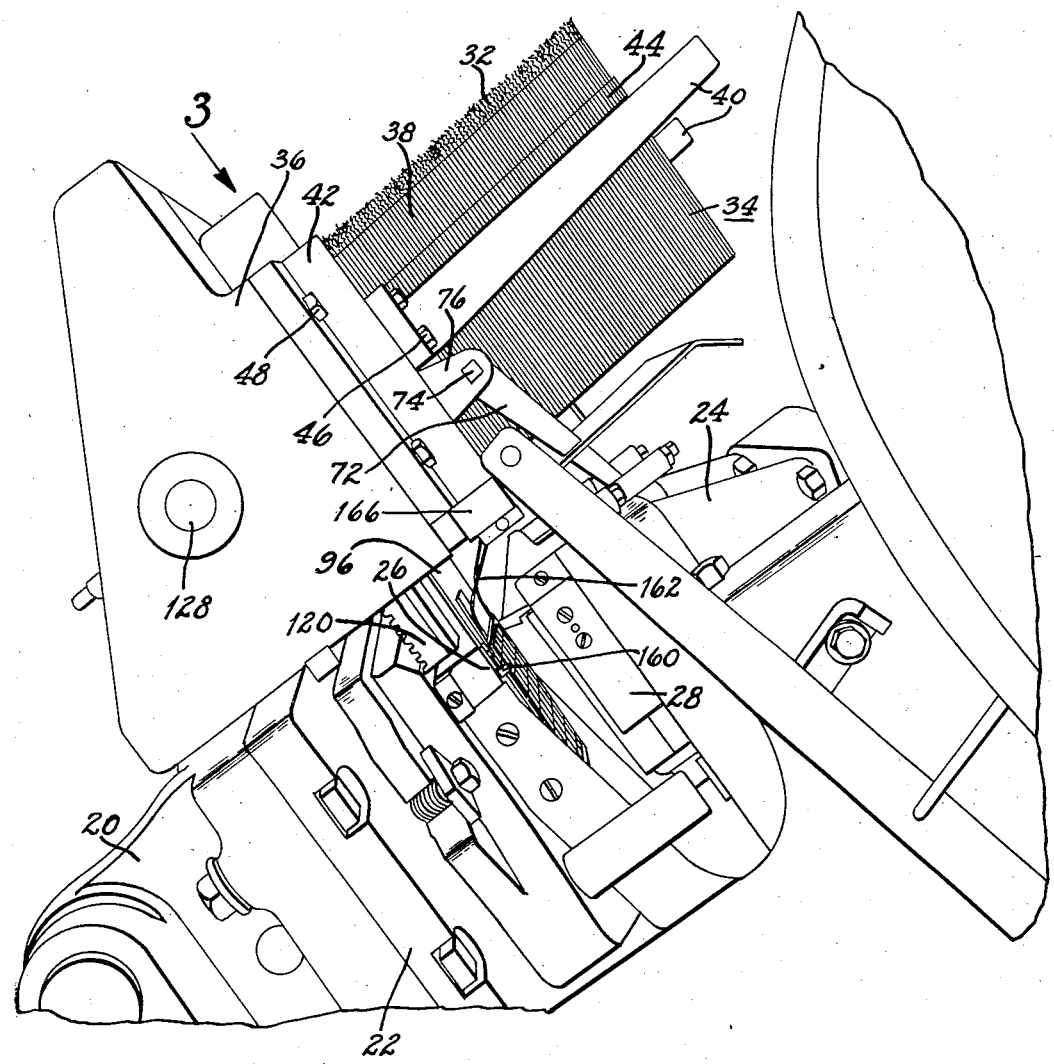
Fig. 1 is a fragmentary perspective view of a machine embodying the present invention.

Referring to the drawings and more particularly to Fig. 1 thereof, the reference numeral 20 designates a punchpress frame having a conventional bolster plate 22 and a conventionally operated ram 24 which, as shown, reciprocates in an inclined path. Mounted on the bolster plate 22 and ram 24 are trimming dies 26 and 28 respectively, adapted to cooperate in order to trim off the flash 30 and 32 at the top and bottom of a cast storage battery grid 34 along the dot and dash line as shown in Fig. 9. Referring again to Fig. 1 there is shown a main frame 36 housing a mechanism for transferring the foremost of a group 38 of stacked storage battery grids 34 from a magazine which comprises two spaced parallel arms 40, fastened to the main frame 36 by intermediation of two brackets 42. These arms 40 support the stack 38 of grids 34 on their tangs 44 (see also Figs. 2, 3 and 4).

The present invention has for its objects the performance of two main functions, namely, the transfer of the foremost grid of the stack 38 from the magazine into cooperative alignment with the coordinated trimming dies 26, 28, and the ejection of a trimmed grid from adjacent the trimming dies. The coordinated structure performing these two main functions will now be described, beginning with—

Transfer of grids from magazine to trimming station

As already explained, the two spaced parallel grid supporting arms 40 are attached by means of screws 46 to the brackets 42 which in turn are secured to the main frame 36 by means of screws 48 as best shown in Fig. 4. Since the two arms 40 are inclined, the grids 34 of the group 38 all tend to descend by gravity in the direction of arrow 50 in Fig. 7 so that the tangs 44 of the foremost grid 34 in the magazine rest against the legs 52 of a U-shaped member 54 which is attached to the brackets 42 by screws 56. The lowermost portion 35 of the foremost grid in the magazine rests against the yoke portion 58 of said U-shaped member 54, thereby preventing not only the foremost grid but also the following grids of the stack 38 from swinging into vertical position by gravity. Guided for linear movement within grooves 60 provided by aligned steps 61 and 62 of the brackets 42 and legs 52 of member 54, are bars 64, each provided with a grooved boss 66 through which extends a pin 68, received by the forked arm 70 of a bell crank lever 72 which is pivoted at 74 to an extension 76 of a bracket 42, and the free arm of said lever is received in an oblong slot 78 of a plate 80 which in any suitable manner is secured to the ram 24 of the punch press.

As best shown in Fig. 7, the steps 62 in the legs 52 of member 54 do not extend throughout the length of these legs which results in a depending shoulder against which the tangs 44 of the foremost segments rests. The bars 64 are provided with a thinner end portion 82 which may reciprocate through the reduced grooves 60a for the purpose of engaging the aligned tangs of the foremost grid 34 in the magazine and raising the same over the mentioned shoulders of the legs 52 of member 54 and also for lifting the lowermost portion 35 of the foremost grid only over the yoke portion 58 of said member 54 so that said foremost grid is free of the holding member 54.

Figure 5:
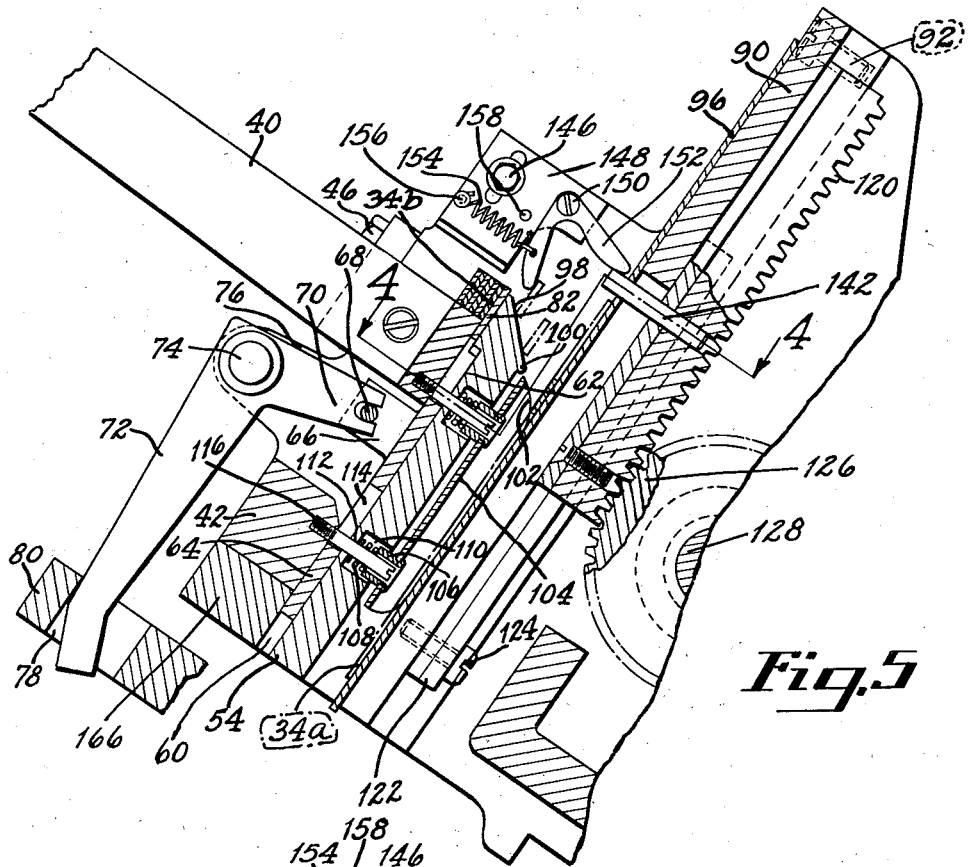
Fig. 5 is a section taken on the line 5—5 of Fig. 4.

As best shown in Figs. 4 and 7, a plate 90 is attached to the main frame 36 by means of a plurality of countersunk screws 92. Slidable on the surface 94 of this plate is a transfer plate 96 which is reciprocated by means to be described later. Referring more particularly to Fig. 5, the foremost grid in the magazine, after having been lifted over the holding member 54 in the explained manner, slides on its tangs down the inclined surfaces 98 of the legs 52 of member 54, over the protruding noses 100 thereof and over the curved end surfaces 102 of two pressure members 104, and finally comes to rest against the transfer plate 96. The two pressure members 104 normally rest against plate 96 as best shown in Figs. 4 and 5, and are provided with bushings 106, each engaging one end of a compression spring 108 which is located in an annular recess. 110 and the legs 52. Extending through each bushing 106, holes 112 of the legs 52 and oblong slots 114 of the bars 64 and threadedly received by the brackets 42, are screw pins 116 which substantially guide said bushings 106 for movement of the pressure members 104 toward and away from the transfer plate 96. As shown in Fig. 4, the pressure members 104 are U-shaped and in the path of movement of the tangs 44 but not of the main body portion of the grid which rests on the transfer plate 96 as shown in Fig. 5. It is obvious that the grid 34a, shown in Fig. 5, lies flat on transfer plate 96 and is prevented from descending by gravity along said plate by means of the pressure members 104 which are in the path of descending movement of the tangs 44 of said grid 34a.

Figure 6:
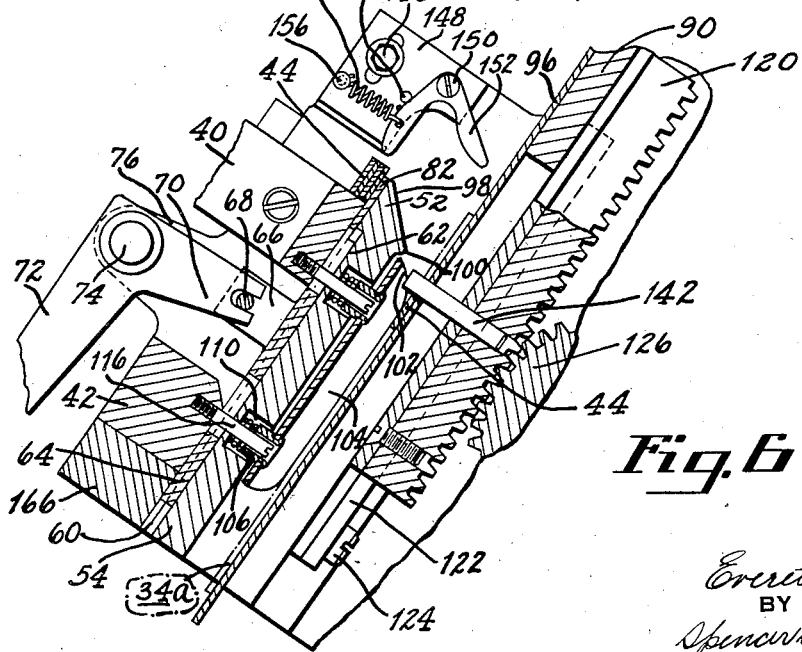

Referring now to Figs. 4 and 5, the plate 90 (Fig. 4) slidably supports two racks 120 which are guided for linear movement and retained on said plate 90 by gib plates 122, secured to said plate by screws 124. These racks 120 are in mesh with identical gears 126, mounted in any suitable manner on a shaft 128 which is journaled in bushings 130, located in bosses 132 of the main frame 36. One end of said shaft 128, extending beyond frame 36, has keyed thereto a small gear 134 (see also Fig. 2), meshing with a gear segment 136 which is pivotally mounted at 138 to the main frame 36 and connected with an eccentric on the crankshaft (not shown) of the punch press by means of a lengthwise adjustable link connection 140. Rotation of the eccentric results in oscillation of the gear segment 136 and rotation of the various gears mounted on shaft 128 and hence reciprocation of the racks 120. As best shown in Fig. 5, each of the two racks 120 pressfittedly receives a pin 142 which extends through an oblong slot of plate 90, through a hole in transfer plate 96 and beyond the latter as shown more particularly in Fig. 3. These pins 142 are in alignment with the tangs 44 of the grid 34a so that upon a downward stroke of the racks 120 and plate 96 from the position shown in Fig. 5 to that shown in Fig. 7, the pins 142 will engage the grid tangs 44 and carry the same and the entire grid past the pressure members 104 which yield sufficiently to let these tangs pass. Since only one flange of each U-shaped pressure member 104 engages the tangs, the pressure members will be cocked as illustrated in Fig. 3, there being enough clearance between the bushings 106 of said pressure members and the screw pins 116 and between said bushings and the annular recesses 110 in the legs 52. The pins 142 pass intermediate the two parallel legs or flanges of the pressure members 104 as shown in Figs. 3 and 4. Adjustably attached by screws 146 to each bracket 42 is a block 148 which pivotally receives at 150 a bell crank lever 152, one arm of which is in the path of movement of a pin 142 and the other arm is in alignment with the tangs 44 of the stack of grids in the magazine. A tension spring 154 is attached with one end to each plate 148 as at 156 and with the other end to a bell crank lever 152, urging the same into engagement with a stop pin 158 projecting from said block 148. It may be stated in advance that immediately after the foremost grid in the magazine has been raised into the dot-and-dash position shown in Fig. 7, the pins 142 during the upward stroke of the racks 120 engage and rock the bell crank levers 142 counter-clockwise as viewed in either Figs. 5, 6 or 7, thereby throwing the raised grid tangs onto the inclined surfaces 98 of the legs 52 of member 54, from where they descend by gravity into the position 34a shown in Fig. 5. By incorporating these levers 152 it is impossible that a raised grid fails for some reason or another to descend along the inclined surface of the legs 52 and into the position 34a.

Immediately after a grid 34a has passed the pressure member 104, i. e. after the pins 142 have pushed the tangs of said grid beyond the pressure members 104, said grid will descend by gravity along the transfer plate 96 until the tangs thereof drop on two spaced stationary pins 160 which are pressfitted into the stationary trimming die 26. The pins 160 are so located on said stationary trimming die that a grid, suspended with its tangs from said pins, is in proper position to be operated upon by the cooperating conventional trimming dies 26, 28, details of which are neither shown nor described because not forming part of the present invention. The free fall of a grid after having cleared the pressure members 104, is braked before descending upon the located pins 160 by a plurality of leaf springs 162 which are attached by screws 164 to a cross bar 166, connecting both brackets 42 and secured thereto by a plurality of screws 168. These leaf springs are in alignment with the tangs of the falling grid (see Figure 9), so that the same never contact the fine screen work of the grid itself. The eccentric (not shown) which actuates the link connection 140 for the purpose of effecting reciprocation of the racks 120 is so constructed that during a downward stroke of ram 24 the racks 120 move in the direction of arrow 170 in Fig. 7 sufficiently so that transfer plate 96 has completely cleared the stationary trimming die 26 before the companion die 28 cooperates with the former and performs a trimming operation. As the reciprocable trimming die 28 approaches its companion die 26, it will first move the delivered grid on said companion die into complete engagement with the latter, if the grid has not already moved into such engagement by its own gravity after the plate 96 has sufficiently withdrawn in the direction of arrow 170 so as to clear not only die 26 but also the delivered grid thereon.

*Ejection of trimmed grid from adjacent the trimming dies*

As best shown in Fig. 8, two latch members 180 are pivotally mounted at 182 to the reciprocable die 28 and normally yieldingly rotated into engagement with a stop pin 184 by means of a tension spring 186. During movement of the reciprocation of die 28 towards its companion die, the latch members 180 ride idly over the two tangs 44 of the grid on the stationary die 26 due to the camming surfaces 188 of each of said latch members. During reciprocation of die 28 away from its companion die 26, the latch members 180 will drag the two tangs of the grid along and beyond the locating pins 160 whereupon said grid descends by gravity either into a suitable container or upon an endless belt conveyor (neither shown).

*Résumé of operation*

It appears from the foregoing description that with each stroke of the punchpress ram 24 the foremost grid 34 in the magazine is transferred into the position designated 34a in Fig. 5, then passed underneath and beyond the pressure members 104 and finally descends upon the locating pins 160. During that same stroke of the punchpress ram 24, a trimmed grid is removed automatically from the locating pins 160 on the stationary die 26 and then descends by gravity to whatever place of delivery is desired.

In order more clearly to expound the cooperation between all the elements of the present device, movement of which is directly or indirectly caused and controlled by the rotation of the punchpress crankshaft, the following résumé of operation is given. It appears from Fig. 7 that during a downward stroke of the ram 24, the following operations take place in the following order: The foremost grid in the magazine is raised beyond the obstructing portions 52 and 58 of the U-shaped member 54 by means of the reciprocable bars 64 and the bell crank levers 72, the grid thus raised is then pushed onto the inclined surfaces 98 of said members 54 by means of the levers 152 which at that time are rocked against the tendency of the tension springs 154 by the pins 142 (see Fig. 5) of the racks 120 during the latter part of their movement in the direction of arrow 170 (Fig. 7). While the grid is held in the position 34a in Fig. 5 by the pressure bars 104 and while the racks 120 change their direction of movement substantially in the position shown in Fig. 5, ram 24 completes a downward stroke and trims the flash off the grid resting on the locating pins 160 of the stationary die 26. The transfer plate 96 during a trimming operation is naturally out of the path of movement of the reciprocable die 28 since the racks 120, with which said transfer plate moves in unison, are in most retracted position at the time a trimming operation takes place. The primary object of the transfer plate 96 is to provide a support for the grid 34a which moves in unison with said grid thereby preventing damage by friction or otherwise to the fine cast screen work of the grid body. The only friction occurs between the tangs of the moving grid 34a and the relatively stationary pressure members 104 and the leaf springs 162, but such friction does not in the least affect the fine screen work of the grid proper. It is, therefore, obvious that during the entire transfer of the grids from the magazine into position for trimming, the screenlike body portion of the grids does hardly slide on any elements of the device. During the latter part of the downward stroke of ram 24 the latch members 180 will ride idly over the tangs of the grid on die 26 and finally latch the same so that upon movement of ram 24 and attached die 28 away from the companion die 26, the latch members will drag the tangs of the trimmed grid over and beyond the locating pins 160 whereupon the grid descends by gravity to a suitable receptacle or is conveyed there by a conventional belt conveyor. Also during movement of ram 24 and attached die 28 away from the companion die 26, the bars 64 are retracted from the position shown in Fig. 5 to that shown in Fig. 7, so that the grid 34b (see Fig. 5) may descend by gravity and by the back thrust, exerted by the following grids, into the position shown in Fig. 7. During the same movement of the ram 24, also the racks 120 are moved from the position shown in Fig. 5 to the position shown in Fig. 7 over that shown in Fig. 6, wherein it is shown that the pins 142 engage the tangs 44 of the grid 34a and push the same past the pressure members 104 whereupon the grid descends by gravity along transfer plate 96 and into registry with the locating pins 160.

While the embodiment of the present invention as hereindisclosed, constitutes a preferred form, it is to be understood that other forms might be adopted, all coming within the scope of the claims which follow.

I claim:

1. In a device of the character described, the combination of cooperating trimming tools; an inclined magazine above the tools for holding a supply of grids in orderly fashion, means obstructing the gravity discharge of the grids from the magazine; and means for transferring one grid at a time from the magazine into cooperative alignment with the tools said means including mechanism for moving said one grid beyond the obstructing means.

2. In a device of the character described, the combination of cooperating trimming tools; an inclined magazine above the tools for holding a supply of grids side-by-side; means obstructing the gravity discharge of the grids from the magazine; and means for transferring the lowermost grid in the magazine into cooperative alignment with the tools, said means including mechanism for edgewise raising said foremost grid beyond the obstructing means.

3. In a device of the character described, the combination of cooperating trimming tools for operating upon an inclined grid; an inclined magazine above the tools for holding a supply of grids side-by-side; means obstructing the gravity discharge of the grids from the magazine; and means for transferring the lowermost grid in the magazine into cooperative alignment with the tools, said means raising said lowermost grid edgewise beyond the obstructing means, guiding the gravitating grid into the inclined plane in which a grid is operated upon and edgewise moving the grid in said plane into cooperative alignment with the tools.

4. In a device of the character described, the combination of cooperating trimming tools for operating upon an inclined grid; an inclined magazine above the tools for holding a supply of grids side-by-side and with their plane parallel to that of a grid operated upon means for obstructing the gravity discharge of the grids from the magazine and means for transferring the lowermost grid in the magazine into cooperative alignment with the tools, said means raising said lowermost grid edgewise beyond the obstructing means, guiding the gravitating grid into the inclined plane in which a grid is operated upon and edgewise lowering the grid into cooperative alignment with the tools.

5. In a device of the character described, the combination of cooperating trimming tools; a magazine above the tools for holding a supply of grids side-by-side; and means for transferring the foremost grid from the magazine into cooperative alignment with the tool, said means raising the foremost grid edgewise out of the magazine, guiding the lifted grid over an inclined path during its descent by gravity into the plane in which a grid is operated upon and moving the grid edgewise in said plane into cooperative alignment with the tools.

6. In a device of the character described, the combination of cooperating trimming tools for operating upon an inclined grid, one of said tools being reciprocable relative to the other; a magazine above the tools for holding a supply of grids side by side; and means for transferring the foremost grid in the magazine into cooperative engagement with the stationary tool, said means raising the foremost grid edgewise out of the magazine, guiding the lifted grid over an inclined path during its descent by gravity into the plane in which a grid is operated upon, and moving the grid edgewise in said plane into cooperative engagement with the stationary tool.

7. In a device of the character described, the combination of cooperating trimming tools one of which is reciprocable relative to the other; an inclined magazine above the tools and holding a supply of grids side-by-side, said magazine having means obstructing the gravity discharge of the grids therefrom; and means for transferring the lowermost grid in the magazine into cooperative engagement with the stationary tool, said means raising the foremost grid edgewise beyond the obstructing means, guiding the raised grid over an inclined path during its descent by gravity into an intermittent position in which its plane is parallel to those of the grids in the magazine, and edgewise moving the grid into cooperative engagement with the stationary tool.

8. In a device of the character described, the combination of cooperating trimming tools, one of which is reciprocable relative to the other; an inclined magazine above the tools and holding a supply of grids side-by-side and lying in planes perpendicular to the magazine and said magazine having means obstructing the gravity discharge of the grids therefrom; and means for transferring the lowermost grid in the magazine into cooperative engagement with the stationary tool, said means raising the foremost grid edgewise beyond the obstructing means, guiding the raised grid over an inclined path during its descent by gravity into an intermediate position in which its plane is parallel to those of the grids in the magazine, and moving the grid edgewise into cooperative engagement with the stationary tool.

9. In a device of the character described, the combination of cooperating trimming tools; a magazine above the tools supporting a supply of grids side-by-side on their opposite projecting tangs; and means for transferring the foremost grid in the magazine into cooperative alignment with the tools, said means including mechanism engaging the tangs of said grid for raising the same out of the magazine, and guides for guiding the raised grid into cooperative alignment with the tools.

10. In a device of the character described, the combination of cooperating trimming tools; an inclined magazine above the tools for supporting a supply of grids on their opposite projecting tangs and lying side by side in planes perpendicular to the magazine, said magazine including means engaging the tangs and the remote bottom portion of the foremost grid in the magazine thereby obstructing the gravity discharge of the grids therefrom; and means for edgewise transferring the foremost grid in the magazine into cooperative alignment with the tools, said transferring means engaging the tangs of the grid.

11. In a device of the character described, the combination of cooperating trimming tools; a magazine above the tools and supporting a supply of grids side by side on their opposite projecting tangs; and means for transferring the foremost grid in the magazine into cooperative alignment with the tools, said means raising the foremost grid on its tangs edgewise out of the magazine, guiding the tangs of the raised grid over an inclined path during its descent by gravity into a position intermediate the magazine and tools and pushing the tangs of the grid thereby moving the latter edgewise into cooperative alignment with the tools.

12. In a device of the character described, the combination of cooperating trimming tools; an inclined magazine above the tools for supporting a supply of grids on their opposite projecting tangs and lying side by side in planes perpendicular to the magazine, said magazine including means engaging the tangs and the remote bottom portion of the lowermost grid in the magazine thereby obstructing the gravity discharge of the grids therefrom; and means for transferring the lowermost grid in the magazine into cooperative alignment with the tools, said means raising said lowermost grid on its tanks edgewise beyond the obstructing means, guiding the tangs of the raised grid over an inclined path during its descent by gravity into a position between the magazine and tools and pushing the tangs of the grid thereby moving the latter linearly and edgewise into cooperative alignment with the tools.

13. In a device of the character described, the combination of cooperating trimming tools one of which is reciprocable toward and away from the other; a magazine holding a supply of grids in orderly fashion; means for transferring one grid at a time from the magazine upon the stationary tool; and means removing a trimmed grid from the stationary tool in response to movement of the other tool away from said stationary tool.

14. In a device of the character described, the combination of cooperating trimming tools one of which is reciprocable toward and away from the other; a magazine above the tools for supporting a supply of grids in orderly fashion on their opposite projecting tangs; means for transferring one grid at a time from the magazine into cooperative engagement with the stationary tool, said means engaging the tangs only of the grid; and means engaging the tangs of a trimmed grid and ejecting the same from the stationary tool upon movement of the other tool away from said stationary tool.

15. In a device of the character described, the combination of cooperating trimming tools one of which is reciprocable toward and away from the other; a magazine above the tools for supporting a supply of grids in orderly fashion on their opposite projecting tangs; means engaging the tangs of the foremost grid in the magazine for transferring the latter into cooperative engagement with the stationary tool upon movement of the other tool through a certain cycle away from said stationary tool and during the entire movement toward the latter; and means engaging the tangs of a trimmed grid and ejecting the same from the stationary tool upon movement of the other tool through a preassigned cycle away from said stationary tool.

16. In a device of the character described, the combination of cooperating trimming tools one of which is reciprocable toward and away from the other; an inclined magazine above the tools for supporting a supply of grids on their opposite projecting tangs and lying side by side in planes perpendicular to the magazine and said magazine having means engaging the tangs and the remote bottom portion of the foremost grid in the magaine for obstructing the gravity discharge of the grids therefrom; means engaging the tangs of the lowermost grid in the magazine for transferring the same edgewise from said magazine into cooperative engagement with the stationary tool; and means engaging the tangs of a trimmed grid for ejecting the same from the stationary tool upon movement of the other tool away from said stationary tool.

17. In a device of the character described, the combination of cooperating trimming tools; an inclined magazine above the tools for supporting a supply of goods on their opposite projecting tangs and lying side by side, said magazine including means engaging the tangs and the remote bottom portion of the lowermost grid in the magazine thereby obstructing the gravity discharge of the grids therefrom; and means for transferring the lowermost grid in the magazine into cooperative alignment with the tools.

18. In a device of the character described, the combination of cooperating trimming tools; an inclined magazine above the tools for supporting a supply of grids on their opposite projecting tangs and lying side by side, said magazine including means engaging the tangs and the remote bottom portion of the lowermost grid in the magazine thereby obstructing the gravity discharge of the grids therefrom; and means for transferring the lowermost grid in the magazine into cooperative alignment with the tools, said means including grid guiding devices and grid moving devices, and the grid moving devices engaging the grid tangs only.

19. In a device of the character described, the combination of cooperating trimming tools; an inclined magazine above the tools for supporting a supply of grids on their opposite projecting tangs and lying side-by-side, said magazine including means engaging the tangs and the remote bottom portion of the lowermost grid in the magazine thereby obstructing the gravity discharge of the grids therefrom; and means for transferring the lowermost grid in the magazine into cooperative alignment with the tools, said means including grid guiding devices and grid moving devices, the grid moving devices engaging the grid tangs only and part of the grid guiding devices being engaged by the grid tangs.

20. In a device of the character described, the combination of cooperating trimming tools; an inclined magazine above the tools for supporting a supply of grids side by side and on their opposite projecting tangs; means for obstructing the gravity discharge of the grids from the magazine; and means for transferring the lowermost grid in the magazine into cooperative alignment with the tools, said means including grid guiding devices and grid moving devices, the grid moving devices and part of the grid guiding devices engaging the grid tangs, and the remaining part of the grid guiding devices being engaged by a plane of a grid and movable with the same during transfer.

21. In a device of the character described, the combination of cooperating grid trimming tools; a magazine above the tools for holding a supply of grids in orderly fashion; a guide for leading a delivered grid from the magazine into cooperative alignment with the tools; means for delivering one grid at a time from the magazine upon the guide; means yieldingly resisting the gravity descent of a grid on the guide during a cycle of its descent into cooperative alignment with the tools; and means for positively feeding the grid past said yielding resisting means.

22. In a device of the character described, the combination of cooperating grid trimming tools; a magazine above the tools for holding a supply of grids in orderly fashion; a guide for leading a delivered grid from the magazine into cooperative alignment with the tools; means for delivering one grid at a time from the magazine upon the guide; means yieldingly resisting the gravity descent of a grid on the guide during an initial cycle of its descent into cooperative alignment with the tools; means for positively feeding the grid past said yielding resisting means; and means for braking the gravitating grid during a later cycle of descent into cooperative alignment with the tools.

23. In a device of the character described, the combination of cooperating grid trimming tools one of which is reciprocable relative to the other; a magazine holding a supply of grids in orderly fashion; a mechanism operated by the movable tool while on its workstroke for transferring one grid at a time from the magazine into an intermediate position: and another mechanism operated by the movable tool while on its return stroke for transferring the grid from said intermediate position into cooperative alignment with the tools.

24. In a device of the character described, the combination of cooperating trimming tools; an inclined magazine above the tools for holding a supply of grids side-by-side; a U-shaped member at the lower end of the magazine, the yoke portion of said member being engaged by the bottom portion of the lowermost grid in the magazine and the legs of said member being engaged by the opposite projecting tangs adjacent the top portion of said lowermost grid; and means for transferring the lowermost grid in the magazine into cooperative alignment with the tools, said means including two simultaneously reciprocable bars for engaging and raising the tangs of the lowermost grid in the magazine beyond the legs of the member whereupon the entire grid is free of the magazine.

25. In a device of the character described, the combination of cooperating trimming tools; an inclined magazine above the tools for holding a supply of grids side-by-side; a U-shaped member at the lower end of the magazine, the yoke portion of said member being engaged by the bottom portion of the lowermost grid in the magazine and the legs of said member being engaged by the opposite projecting tangs adjacent the top portion of said lowermost grid; those surfaces of the legs opposite the tang engaging surfaces thereof being inclined with respect to the latter surfaces and substantially merging into the same and being adapted to guide a free grid on its tangs during its descent by gravity into a position intermediate the magazine and the tools; and means for transferring the lowermost grid in the magazine into cooperative alignment with the tools, said means including mechanism for raising the tangs of said lowermost grid above the legs whereby the entire grid is free of the magazine and mechanism for transferring said grid from said intermediate position into cooperative alignment with the tools.

26. In a device of the character described, the combination of a stationary and a cooperating movable trimming tool; an inclined magazine above the tools for holding a supply of grids side-by-side; a U-shaped member at the lower end of the magazine, the yoke portion of said member being engaged by the bottom portion of the lowermost grid in the magazine and the legs of said member being engaged by the opposite projecting tangs adjacent the top portion of said lowermost grid; means for transferring the lowermost grid in the magazine into cooperative alignment with the tools; said means including two reciprocable bars for engaging and raising the tangs of said lowermost grid beyond the legs of the member whereupon the entire grid is free of the magazine; and means for simultaneously reciprocating the bars in timed relation with movement of the movable tool.

27. In a device of the character described, the combination of a stationary and cooperating movable trimming tool for operating upon an inclined grid lying flat against the stationary tool and resting on projections provided by the latter tool; a magazine above the tools for holding a supply of grids in orderly fashion; a plate having spaced projections and being reciprocable in a plane close to and parallel to the grid receiving surface of the stationary tool; means yieldingly resisting the descent of a grid along the plate by gravity; and means for transferring the foremost grid in the magazine flat upon the plate and resting on said yielding resisting means, whereupon the projections of the descending plate push the grid past the yielding resisting means and into engagement with the projections of the stationary tool.

28. In a device of the character described, the combination of a stationary and cooperating movable trimming tool for operating upon an inclined grid lying flat against the stationary tool and resting with its oppositely extending tangs on projections provided by the latter tool; a magazine above the tools for holding a supply of grids in orderly fashion, a plate having spaced projections and being reciprocable in a plane close to and parallel to the grid receiving surface of the stationary tool; means engaging the tangs of a grid and yieldingly resisting the descent of the same along the plate by gravity; and means for transferring the foremost grid in the magazine flat upon the plate with its tangs resting on said yielding resisting means, whereupon the projections of the descending plate engage the grid tangs and push the same past the yielding resisting means into engagement with the projections of the stationary tool.

29. In a device of the character described, the combination of a stationary and cooperating movable trimming tool for operating upon an inclined grid lying flat against the stationary tool and resting on projections provided by the latter tool; a magazine above the tools for holding a supply of grids in orderly fashion; a plate having spaced projections and being reciprocable in a plane close to and parallel to the grid receiving surface of the stationary tool; means yieldingly resisting the descent of a grid along the plate by gravity; means for transferring the foremost grid in the magazine flat upon the plate and resting on said yielding resisting means, whereupon the projections of the descending plate push the grid past the yielding resisting means and into engagement with the projections of the stationary tool; and means for reciprocating the plate in timed relation with movement of the movable tool.

30. In a device of the character described, the combination of a stationary and cooperating movable trimming tool for operating upon an inclined grid lying flat against the stationary tool and resting on projections provided by the latter tool; an inclined magazine above the tools for holding a supply of grids side-by-side; a U-shaped member at the lower end of the magazine, the yoke portion of said member being engaged by the bottom portion of the lowermost grid in the magazine and the legs of said member being engaged by the opposite projecting tangs adjacent the top portion of said lowermost grid; a plate having spaced projections and being reciprocable in a plane close to and parallel to the grid receiving surface of the stationary tool; means engaging the tangs of a grid and yieldingly resisting the descent of the same along the plate by gravity; means for raising the tangs of said lowermost grid above the topmost surfaces of the legs whereupon the entire grid is free of the magazine; pivotally mounted levers engaged by the projections of the ascending plate and rotated thereby sufficiently to engage and shove the tangs of the free grid along and beyond said topmost leg surfaces whereupon the grid drops by gravity flat upon the plate with its tangs resting on said yielding resisting means, the projections of the descending plate thereafter engaging the grid tangs and pushing the same past the yielding resisting means into engagement with the projections of the stationary tool.

31. In a device of the character described, the combination of a stationary and cooperating movable trimming tool for operating upon an inclined grid lying flat against the stationary tool and resting with its oppositely projecting tangs on pins projecting from the latter tool; and yielding latches pivotally mounted on the movable tool; said latches riding idly over the grid tangs when the movable tool approaches its companion tool and engaging and moving the grid tangs from their resting pins when the movable tool separates from its companion tool.

EVERETT W. BEEKMAN.